(12) United States Patent
Kaneda et al.

(10) Patent No.: US 6,343,218 B1
(45) Date of Patent: Jan. 29, 2002

(54) TRANSMISSION POWER CONTROL METHOD, MOBILE PHONE, BASE STATION, AND RECORDING MEDIUM

(75) Inventors: Ryusuke Kaneda, Yokohama; Seiji Hagiwara; Akihiro Higashi, both of Yokosuka, all of (JP)

(73) Assignee: NTT Docomo Inc., Tokyo (JP)

( * ) Notice: Subject to any disclaimer, the term of this patent is extended or adjusted under 35 U.S.C. 154(b) by 0 days.

(21) Appl. No.: 09/381,221

(22) PCT Filed: Jan. 14, 1999

(86) PCT No.: PCT/JP99/00099

§ 371 Date: Sep. 16, 1999

§ 102(e) Date: Sep. 16, 1999

(87) PCT Pub. No.: WO99/37111

PCT Pub. Date: Jul. 22, 1999

(30) Foreign Application Priority Data

Jan. 16, 1998 (JP) .............................. 10-6744
Apr. 17, 1998 (JP) .......................... 10-107710

(51) Int. Cl.[7] ............................................. H04B 7/005
(52) U.S. Cl. ...................................... 455/522; 370/335
(58) Field of Search ................................. 455/522, 442, 455/436, 437, 438, 439; 370/335, 342

(56) References Cited

U.S. PATENT DOCUMENTS 5,299,226 A * 3/1994 Schilling .................... 375/200
5,333,175 A * 7/1994 Ariyavisitakul et al. .... 455/423
5,574,983 A * 11/1996 Douzono et al. ............. 455/69
5,933,782 A * 8/1999 Nakano et al. ............. 455/522
5,978,657 A * 11/1999 Suzuki ...................... 455/54.2

FOREIGN PATENT DOCUMENTS

| EP | 0 682 418 A2 | 11/1995 |
| JP | 8-32515 | 8/1996 |
| JP | 8-213921 | 8/1996 |
| JP | 9-312609 | 12/1997 |

* cited by examiner

Primary Examiner—Dwayne Bost
Assistant Examiner—Miguel D. Green
(74) Attorney, Agent, or Firm—Brinks Hofer Gilson & Lione

(57) ABSTRACT

A mobile station according to the present invention that is capable of connecting simultaneously to a plurality of base stations comprises a reception radio portion and TPC bit detecting portions, for receiving and detecting TPC bits (transmission power control signals) from the plurality of base stations during soft handover; a combining portion, for combining the detected TPC bits to determine a combination signal; and a transmission power control deciding portion, for controlling the transmission power of the mobile station based on the combination signal determined by the combining portion. A method according to the present invention governs use of the mobile station hereof.

42 Claims, 11 Drawing Sheets

FIG. 11
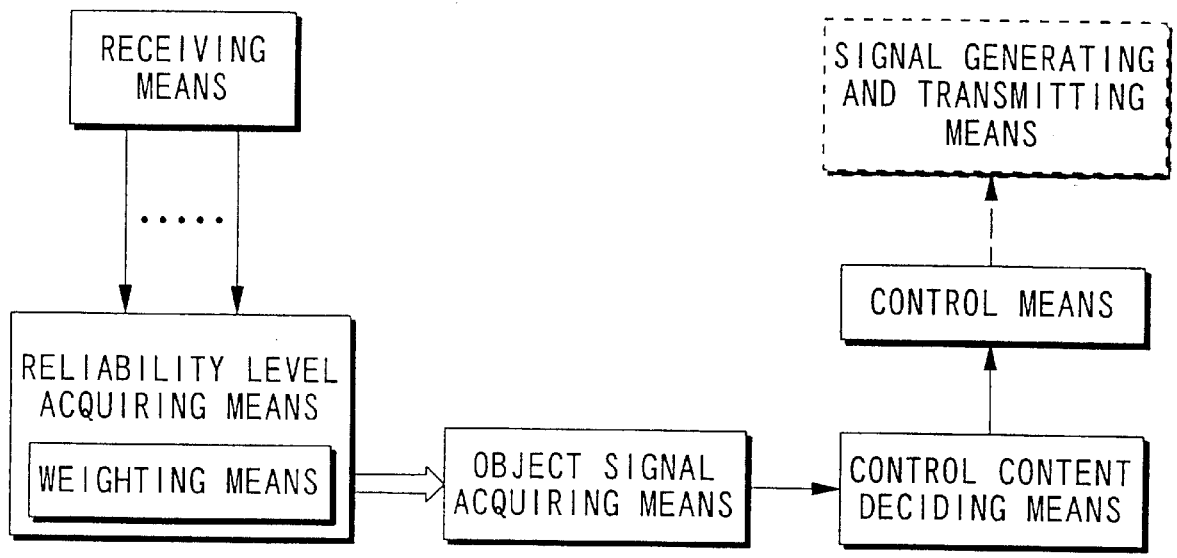
FIG. 12
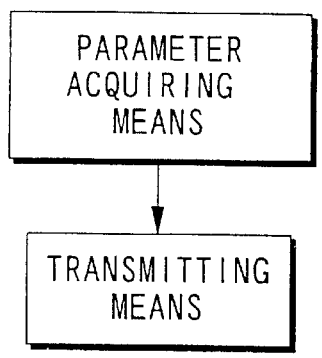
FIG. 13
| TPC BIT | BASE STATION A | 0 | 0 | 1 | 1 |
|---|---|---|---|---|---|
| | BASE STATION B | 0 | 1 | 0 | 1 |
| POWER AMOUNT | | DECREASE | DECREASE | DECREASE | INCREASE |

TRANSMISSION POWER CONTROL METHOD, MOBILE PHONE, BASE STATION, AND RECORDING MEDIUM

BACKGROUND OF THE INVENTION

1. Technical Field

The present invention relates to a mobile station and a base station in a mobile communication system with transmission power control, a transmission power control method for mobile stations, and a recording medium containing a program for achieving this transmission power control method.

2. Background Art

In mobile radio systems, a service area is formed by providing a number of radio zones, which are circular areas centered around base stations. For the purposes of covering the service area fully, the base stations are provided so that a plurality of radio zones will overlap at the edges of the radio zones.

Since the radio zones are centered around base stations, the intensity of a desired signal to be received by a mobile station in a service area will be high in the vicinity of the base station but low near the radio zone edges. Since the communication quality will be reduced if an interfering signal is stronger than the desired signal, efforts have been made in existing mobile radio systems to retain the service quality by performing handover to another radio zone capable of achieving better communication quality when a mobile station has moved to the edge of a radio zone.

On the other hand, in CDMA (code division multiple access) systems, transmission power control is performed to always keep the transmission power of mobile stations as low as possible, for the purposes of retaining capacity and quality and reducing interference with other stations. The transmission power control in these mobile stations is achieved by closed-loop control, wherein the transmission power is increased and decreased in accordance with instructions given by the content of a single-bit transmission power control signal (hereinafter referred to as a TPC bit) sent from the base station.

Additionally, in the case of so-called soft handover, the mobile station simultaneously connects to a plurality of connectable base stations, and begins control of the switching between radio zones. At this time, the mobile station detects the TPC bits sent from the plurality of base stations by the above-mentioned closed-loop control, and decides and controls its own transmission power based on the content of the detected TPC bits. Here, an example of the transmission power control during soft handover in a mobile station is shown in FIG. 13. In the example shown in FIG. 13, the transmission power is increased only when the content of the TPC bits from all of the connected base stations gives instructions for a transmission power increase (the value of the TPC bit is "1"), and otherwise, the transmission power is decreased.

However, during soft handover, the mobile station is not capable of receiving the signals from all of the connected base stations with the same quality. That is, there is a possibility of the reception quality of the signal from a certain base station being degraded. Degradations in the signal reception quality from a base station mean an increase in the error rate for transfer of the TPC bit from that base station. As described above, since a substance of the transmission power control of a conventional mobile station is decided by combining the contents of all TPC bits detected by the mobile station, an increase in the error rate for transfer of the TPC bit from one base station will directly lead to an increase in the probability that inappropriate transmission power control will be performed.

Moreover, in the above-described example, wherein the transmission power is increased only when the contents of the TPC bits from all of the connected base stations are "1" (when the TPC bits from all of the connected base stations give instructions for transmission power increase) as shown in FIG. 13, the probability that the transmission power will be made smaller than necessary will rise when the error rate for transfer of a TPC bit from a single base station increases. This is due to the fact that if an error arises in a TPC bit from a base station B when the combination of TPC bits sent from a base station A and base station B is "11" (transmission power increase), the reception pattern will become "10", and will result in a transmission power decrease, whereas if an error arises in the a TPC bit from base station B when the combination of TPC bits sent from base station A and base station B is "00", "10" or "01" (transmission power decrease), the reception pattern will become "01", "11" or "00", and will not always result in a transmission power increase. This effect can be expected to become more pronounced when the number of connected base stations is large.

In the end, as is clear from what is described above, the transmission power control of a conventional mobile station has a problem in that when the reception quality of the signals from any one of the base stations is low, then appropriate power control cannot be performed during soft handover, and the communication quality is reduced.

BRIEF SUMMARY OF THE INVENTION

The present invention has been made in view of the above background, and has the object of offering a mobile station and a base station, a transmission power control method for a mobile station, and a recording medium containing a program for achieving this transmission power control method, which are capable of appropriately controlling the transmission power of the mobile station during soft handover, even if the reception qualities of the signals from the connected base stations are not the same.

In order to resolve the above-mentioned problems, in a first aspect, the present invention comprises a transmission power control method for a mobile station simultaneously connected to a plurality of base stations. The method comprises a receiving step for receiving a transmission power control signal from each of said plurality of base stations in said mobile station; a reliability level acquiring step for acquiring a reliability level for each of said plurality of base stations; an object signal acquiring step for determining an object signal from said reliability levels acquired in said reliability level acquiring step and said plurality of transmission power control signals received in said receiving step; a control content deciding step for deciding a control content of the transmission power of said mobile station based on said object signal determined in said object signal acquiring step; and a control step for controlling the transmission power of said mobile station in accordance with the control content decided in said control content deciding step. According to this transmission power control method, the object signal is determined in the mobile station in consideration of not only the plurality of transmission power control signals, but also of the reliability level of each of the plurality of base stations, and the transmission power control is performed on the basis of this object signal. Therefore, the influence of a transmission power control signal for which an error has occurred during transfer can be made small. As a result, transmission power control can be performed with high precision, and the degradation of the communication quality and the degradation of the subscriber capacity can be prevented.

Additionally, in the above-described transmission power control method, it is possible, in said mobile station, to acquire a parameter based on a downward signal from each of said plurality of base stations, and generate a reliability level with respect to each of said plurality of base stations in accordance with said parameter; or in each of said plurality of base stations, to acquire a parameter based on an upward signal from said mobile station, and send said parameter to said mobile station, and in said mobile station, generate a reliability level with respect to each of said plurality of base stations in accordance with the parameter sent from each of said plurality of base stations; or in each of said plurality of base stations, to acquire a parameter based on an upward signal from said mobile station, generate a reliability level for itself based on said parameter, and transmit the generated reliability level to said mobile station; and in said mobile station, receive the reliability level sent from each of said plurality of base stations. In particular, when the parameters are acquired in each of said plurality of base stations, transmission power control can be performed with higher precision in the mobile station.

Furthermore, the following characteristics can also be appended to the above-described transmission power control method.

A weighting step for weighting the transmission power control signals received in said receiving step according to said plurality of reliability levels acquired in said reliability level acquiring step can be provided; said object signal acquiring step can include generating said object signal by combining the plurality of transmission power control signals weighted in said weighting step.

The object signal acquiring step can include selecting one signal from among the transmission power control signals received in said receiving step based on said plurality of reliability levels acquired in said reliability level acquiring step, and taking the selected signal as said object signal.

The control content deciding step can include comparing said object signal determined in said object signal acquiring step with two preset threshold values, and selecting and determining the control content of said mobile station from among the three stages of an increase, maintenance or decrease of the transmission power based on the results of the comparison.

The control can be performed, in said control content deciding step, by changing the transmission power of said mobile station by a control amount in accordance with said object signal determined in said object signal acquiring step.

Additionally, in order to resolve the above-mentioned problems, in a second aspect, the present invention comprises a mobile station capable of simultaneously connecting with a plurality of base stations. The mobile station comprises receiving means for receiving a transmission power control signal from each of said plurality of base stations; reliability level acquiring means for acquiring a reliability level with respect to each of said plurality of base stations; object signal acquiring means for determining an object signal based on said plurality of transmission power control signals received from said receiving means and said plurality of reliability levels acquired from said reliability acquiring means; control content deciding means for deciding a control content of the transmission power of said mobile station based on said object signal determined by said object signal acquiring means; and control means for controlling the transmission power in accordance with said control content decided by said control content deciding means. According to this mobile station, the object signal is determined in the mobile station in consideration of not only the plurality of transmission power control signals, but also of the reliability level of each of the plurality of base stations, and the transmission power control is performed on the basis of this object signal. Therefore, the influence of a transmission power control signal for which an error has occurred during transfer can be made small. As a result, transmission power control can be performed with high precision, and the degradation of the communication quality and the degradation of the subscriber capacity can be prevented.

Additionally, in the above-described mobile station, the reliability level acquiring means can acquire a parameter based on a signal from each of said plurality of base stations received by said receiving means, and generate a reliability level with respect to each of said plurality of base stations in accordance with said parameter. The reliability level acquiring means can generate a reliability level with respect to each of said plurality of base stations in accordance with a parameter from each of said plurality of base stations received by said receiving means. The reliability level acquiring means can take the reliability level from each of said plurality of base stations received by said receiving means as the reliability level with respect to each of said plurality of base stations. In particular, when the parameters are acquired in each of said plurality of base stations, transmission power control can be performed with higher precision in the mobile station.

Furthermore, the following characteristics can be appended to the above-described mobile station.

The mobile station further comprises weighting means for weighting each transmission power control signal received by said receiving means by the reliability level of a corresponding base station, and said object signal acquiring means can generate said object signal by combining the plurality of transmission control signals weighted by said weighting means.

The object signal acquiring means can select one from among said plurality of transmission power control signals to be said object signal.

The control content deciding means can compare said object signal determined by said object signal acquiring means with two preset threshold values, and select and decide from among the three stages of increase, maintenance or decrease of the transmission power as said control content based on the results of this comparison.

The control content deciding means can take, as the control content, control performed by changing the transmission power by a control amount in accordance with said object signal determined by said object signal acquiring means.

Additionally, in order to resolve the above-described problems, a base station of the present invention is a base station for performing the above-described transmission power control method wherein a parameter is acquired in said reliability level acquiring step for each of said plurality of base stations based on an upward signal from said mobile station; comprising parameter acquiring means for acquiring said parameter with respect to said mobile station based on an upward signal from said mobile station; and transmission means for transmitting said parameter acquired by said parameter acquiring means to said mobile station. By using the parameter acquired in this base station in the mobile station, transmission power control can be performed with higher precision in the mobile station.

Additionally, in order to resolve the above-described problems, a recording medium of the present invention contains a program to be run in a mobile station simultaneously connected to a plurality of base stations; the program comprising a receiving step for receiving a transmission power control signal form each of said plurality of base stations; a reliability level acquiring step for acquiring a reliability level with respect to each of said plurality of base stations; an object signal acquiring step for determining an object signal from said reliability levels acquired in said reliability level acquiring step and said plurality of transmission power control signals received in said receiving step; a control content deciding step for deciding a control content of the transmission power of said mobile station based on said object signal determined in said object signal acquiring step; and a control step for controlling the transmission power of said mobile station in accordance with said control content decided by said control content deciding step. By running the program recorded in this recording medium in the mobile station, the object signal is determined in the mobile station in consideration of not only the plurality of transmission power control signals, but also of the reliability level of each of the plurality of base stations, and the transmission power control is performed on the basis of this object signal. Therefore, the influence of a transmission power control signal for which an error has occurred during transfer can be made small. As a result, transmission power control can be performed with high precision, and the degradation of the communication quality and the degradation of the subscriber capacity can be prevented.

BRIEF DESCRIPTION OF THE SEVERAL VIEWS OF THE DRAWING

FIG. 11 is a block diagram for explaining an example of the structure of a mobile station according to the present invention.

FIG. 12 is a block diagram for explaining an example of the structure of a base station according to the present invention.

FIG. 13 is a diagram for explaining the transmission power control of a mobile station during soft handover in a conventional CDMA system.

DETAILED DESCRIPTION OF THE INVENTION

Herebelow, a preferred embodiment of the present invention shall be explained with reference to the drawings. The mobile station in this embodiment basically has a structure which is based on the structure of the mobile station of the present invention which is described in the "Summary of the Invention" section. Therefore, in order to simplify the understanding of the embodiment here, a structural example of the mobile station of the present invention is shown in FIG. 11.

In the structural example of FIG. 11, the mobile station generally comprises receiving means, reliability level acquiring means, object signal acquiring means, control content deciding means, and control means. The control means controls signal generating and transmitting means for generating and transmitting signals to be transmitted. Additionally, the signal (information) supplied from the reliability level acquiring means to the object signal acquiring means could be either singular or plural. For example, when the reliability level acquiring means includes weighting means, the plurality of weighted signals will be supplied to the object signal acquiring means, but if it is possible to allow the weighting coefficient to be 0, then there may be cases where only a single signal is supplied to the object signal acquiring means. The signal exchange relationship between the receiving means, the reliability level acquiring means and the object signal acquiring means is not restricted to that given as an example in FIG. 11. For example, it is possible to have the reliability level acquiring means (weighting means) output only weighting coefficients (equivalent to reliability), and to directly input a plurality of signals outputted from the receiving means while also inputting the weighting coefficients from the reliability level acquiring means into the object signal acquiring means.

The base stations for communicating with the above-described mobile station have some structure in common with normal base stations. However, when applied to a mobile radio system which acquires the parameters indicating the reliability level on the base station side, the base stations will be provided with parameter acquiring means, as shown in FIG. 12.

A: First Embodiment

A-1: Structure

Figure 1:
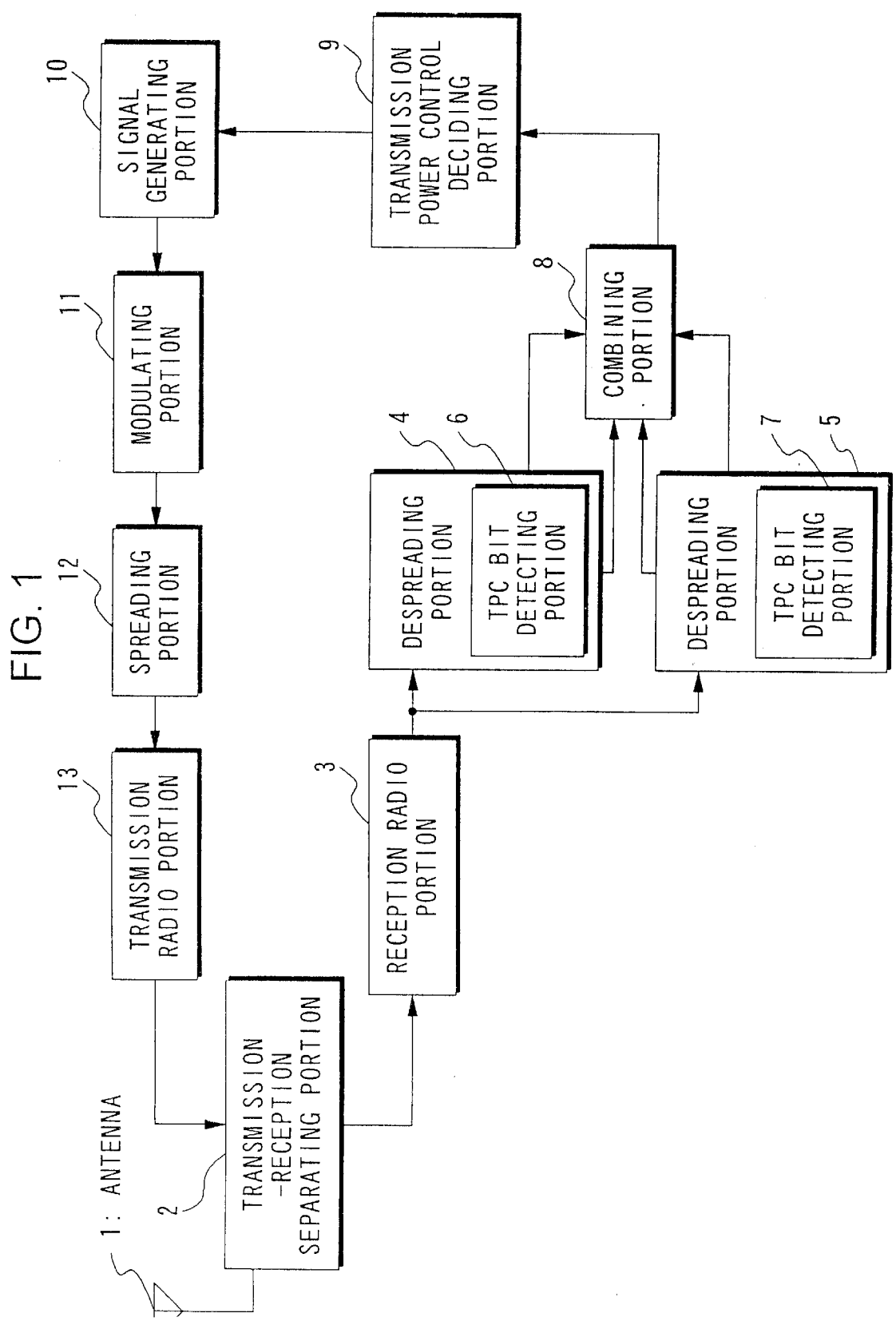
FIG. 1 is a block diagram showing the structure of the essential portions of a mobile station according to the first embodiment of the present invention.

FIG. 1 is a block diagram showing the structure of the essential portions of a mobile station 16 according to a first embodiment of the present invention. The mobile station 16 having the structure shown in FIG. 1 is available to a CDMA system.

In FIG. 1, reference number 1 denotes an antenna for issuing radio waves in accordance with a transmission signal to be transmitted, and for receiving radio waves from base stations and generating corresponding reception signals. Reference number 2 denotes a transmission-reception separating portion. Reference number 3 denotes a reception radio portion. The transmission-reception separating portion 2 supplies transmission signals to the antenna 1, and supplies reception signals from the antenna 1 to the reception radio portion 3.

Figure 2:
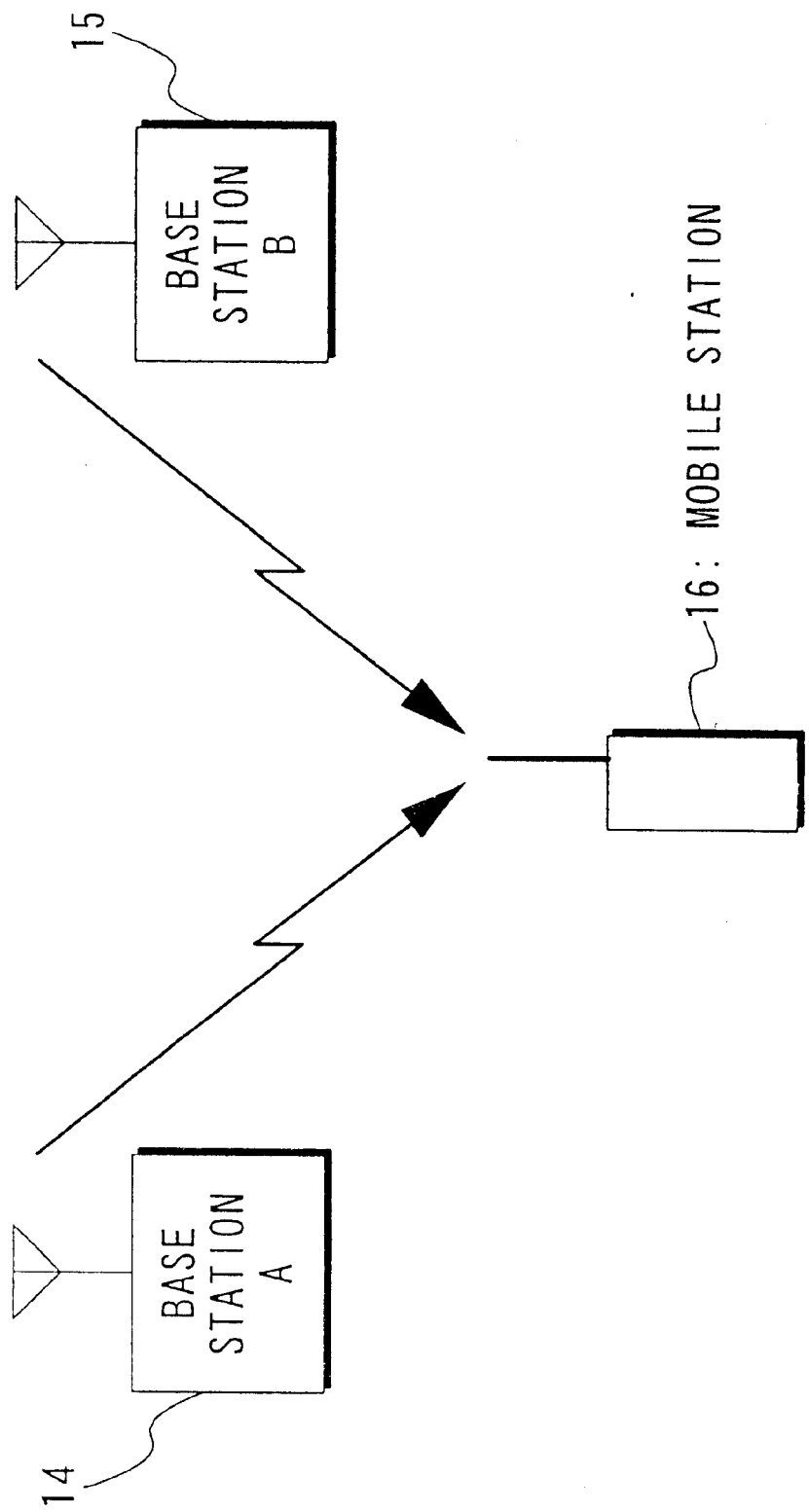
FIG. 2 is a diagram showing the state of connection between the mobile station and base stations during soft handover in a CDMA system.

Reference numbers 4 and 5 denote despreading portions, for despreading reception signals received from the reception radio portion 3. As shown in FIG. 2, the despreading, which is performed during soft handover where the mobile station 16 is connected simultaneously to the base station A14 and the base station B15, is performed using a spreading code corresponding to base station A14 in the despreading portion 4 and a spreading code corresponding to the base station B15 in the despreading portion 5. In the despreading portion 4, reference number 6 denotes a TPC bit detecting portion for detecting and outputting TPC bits from the signals obtained by despreading. A TPC bit detecting portion 7 having the same function is provided within the despreading portion 5. Furthermore, each TPC bit detecting portion 6, 7 determines and outputs reliability information (e.g. a frame error rate) for performing weighting which is proportional to the signal power and inverse-proportional to the noise power, based on a reception power (signal power) obtained by averaging the detected TPC bits by a predetermined time constant and an average SIR (signal-to-noise power ratio) for the most recent predetermined time period.

Reference number 8 denotes a combining portion, for maximum ratio combining two TPC bits outputted from the TPC bit detecting portions 6, 7, which weights each TPC bit with corresponding reliability information, then combines them on the IQ plane. The coordinate system of the IQ plane is an orthogonal coordinate system of in-phase components and orthogonal components. Reference number 9 is a transmission power control deciding portion for comparing signals combined by the combining portion 8 (object signals, hereinafter referred to as combination signals) with a preset threshold value, deciding the content of the transmission power control based on the comparison result (either a 1 dB increase or a 1 dB decrease in the present embodiment), and controlling the transmission power in accordance with this content. Reference number 10 denotes a signal generating portion for generating a transmission signal having a transmission power controlled by the transmission power control deciding portion 9. Reference number 11 denotes a modulating portion for modulating the transmission signal generated by the signal generating portion 10; reference number 12 denotes a spreading portion for spreading the transmission signal modulated by the modulating portion 11; and reference number 13 denotes a radio transmitting portion for supplying the transmission signal spread by the spreading portion 12 to the antenna 1 via the transmission-reception separating portion 2.

A-2: Operations

Next, the above-mentioned mobile station 16 shall be explained in detail.

As shown in FIG. 2, during soft handover wherein the mobile station connects simultaneously with the base station A14 and the base station B15, the reception signals pass through the antenna 1, the transmission-reception separating portion 2 and the reception radio portion 3, and are despread at the despreading portions 4, 5. As a result, a signal corresponding to the base station A14 is obtained in the despreading portion 4 and a signal corresponding to the base station B15 is obtained in the despreading portion 5. Then, a TPC bit from the base station A14 is detected at the TPC bit detecting portion 6, and a TPC bit from the base station B15 is detected at the TPC bit detecting portion 7. Additionally, reliability information corresponding to the base station A14 and reliability information corresponding to the base station B15 are determined in the respective TPC bit detecting portions 6, 7, and TPC bit combination is performed in the combining portion 8 based on the above-described TPC bits and reliability information.

Figure 3:
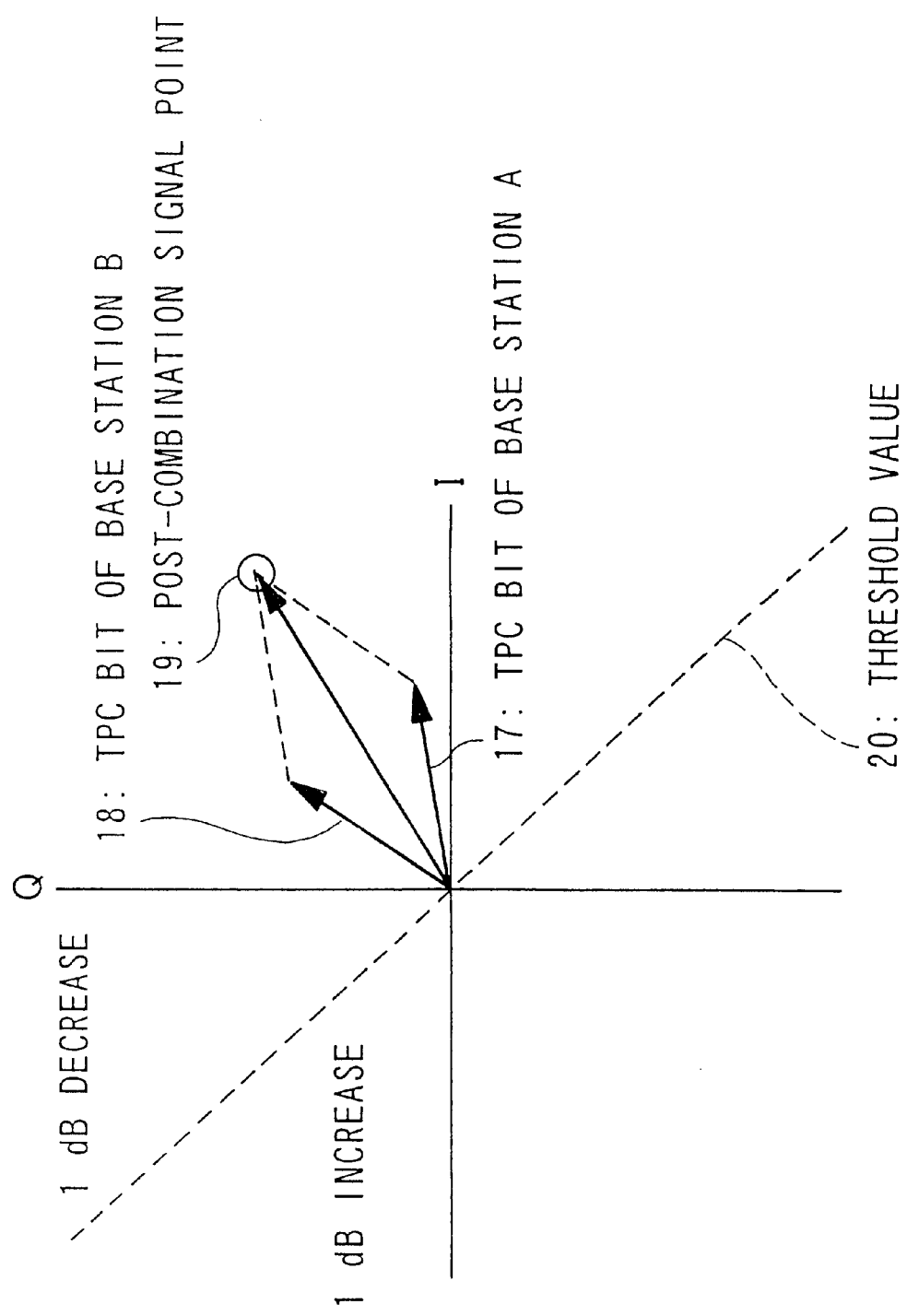
FIG. 3 is a diagram for explaining the combination process by the combining portion of the mobile station during soft handover in a CDMA system.

FIG. 3 is a diagram for explaining a combining process in the combining portion 8, showing an example wherein the transmission power is reduced by 1 dB. In this diagram, reference number 20 denotes a threshold value, represented by the line:

$$Q=-I$$

Additionally, reference number 17 denotes a vector representing the TPC bit of the base station A, and reference number 18 denotes a vector representing the TPC bit of the base station B. Each vector has as a starting point the origin of the IQ plane, and has a length which is in accordance with the corresponding reliability information. The point opposite the origin in the parallelogram having the two vectors as two adjacent sides is the post-combination signal point 19, and the vector having the origin as a starting point and the post-combination signal point 19 as the end point represents the above-mentioned combination signal.

Since the post-combination signal point 19 is positioned on the first quadrant side (1 dB decrease region) with respect to the threshold value 20 in the example shown in FIG. 3, the content of the transmission power control decided by the transmission power control deciding portion 9 will be a "1 dB decrease". Therefore, the transmission power of the transmission signal generated by the signal generation portion 10 will decrease by 1 dB. Of course, the third quadrant side of the threshold value 20 is a 1 dB increase region, and the threshold value 20 itself is a 1 dB decrease region.

Figure 4:
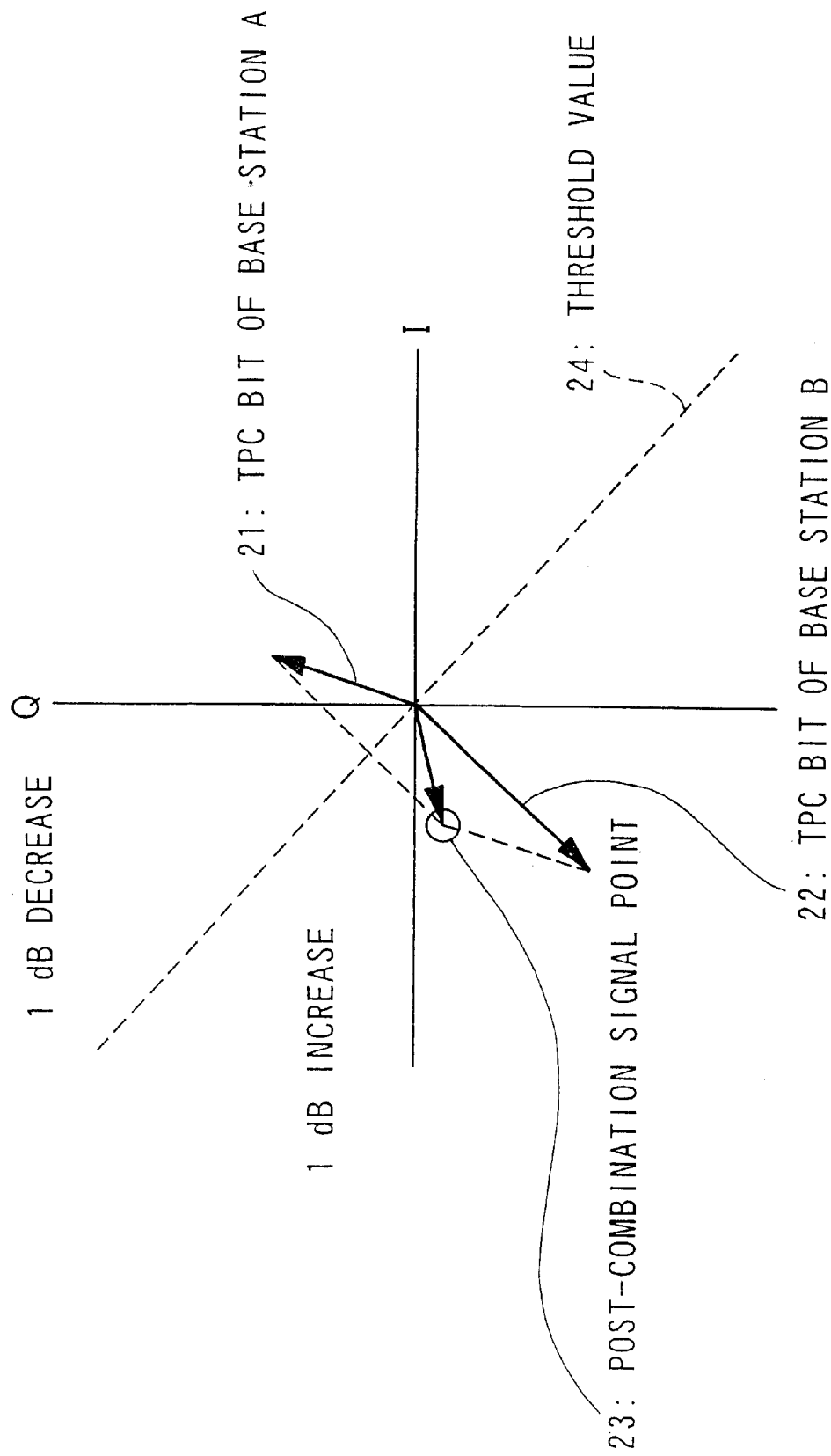
FIG. 4 is a diagram for explaining the combination process by the combining portion of the mobile station during soft handover in a CDMA system.

On the other hand, FIG. 4 shows an example wherein the transmission power is increased by 1 dB. In this drawing, reference numbers 21, 22, 23, and 24 respectively denote a TPC bit of the base station A, a TPC bit of the base station B, a post-combination signal point, and a threshold value. Since the post-combination signal point 23 is positioned to the third quadrant side (1 dB increase region) with respect to the threshold value 24 in the example shown in FIG. 4, the content of the transmission power control decided by the transmission power control deciding portion 9 will be a "1 dB increase". Therefore, the transmission power of the transmission signal generated by the signal generating portion 10 will increase by 1 dB.

A-3: Summary

As explained above, according to the first embodiment, the TPC bits received from a plurality of connected base stations are combined, then compared with a threshold value, so as to avoid the problem that the transmission power will always be decreased if an error occurs in the transfer of one of the TPC bits when all of the base stations are sending a TPC bit indicating an increase of the transmission power. Additionally, the TPC bits are combined after weighting them according to reliability information, so as to reduce the influence of TPC bits from base stations which often have transfer errors on the transmission power control of the mobile station. As a result, it is possible to realize more accurate transmission power control. Moreover, mobile stations are normally provided with means for maximum ratio combining as a measure for dealing with multi-path problems, and the precision of transmission power control can be increased without adding any new circuitry by making use of such means.

A-4: Modification Example 1

Next, a modification example 1 of the above-described first embodiment shall be explained. The structure of the mobile station according to this modification example 1 is the same as that of the mobile station 16 shown in FIG. 1, and the operations differ only in the control content deciding process in the transmission power control deciding portion 9. Therefore, only the control content deciding process will be explained. In the transmission power control deciding portion 9 in the present modification example, the post-combination signal point from the combining portion 8 is compared with two preset threshold values, and the control content is chosen between a 1 dB decrease, maintenance, and a 1 dB increase.

Figure 5:
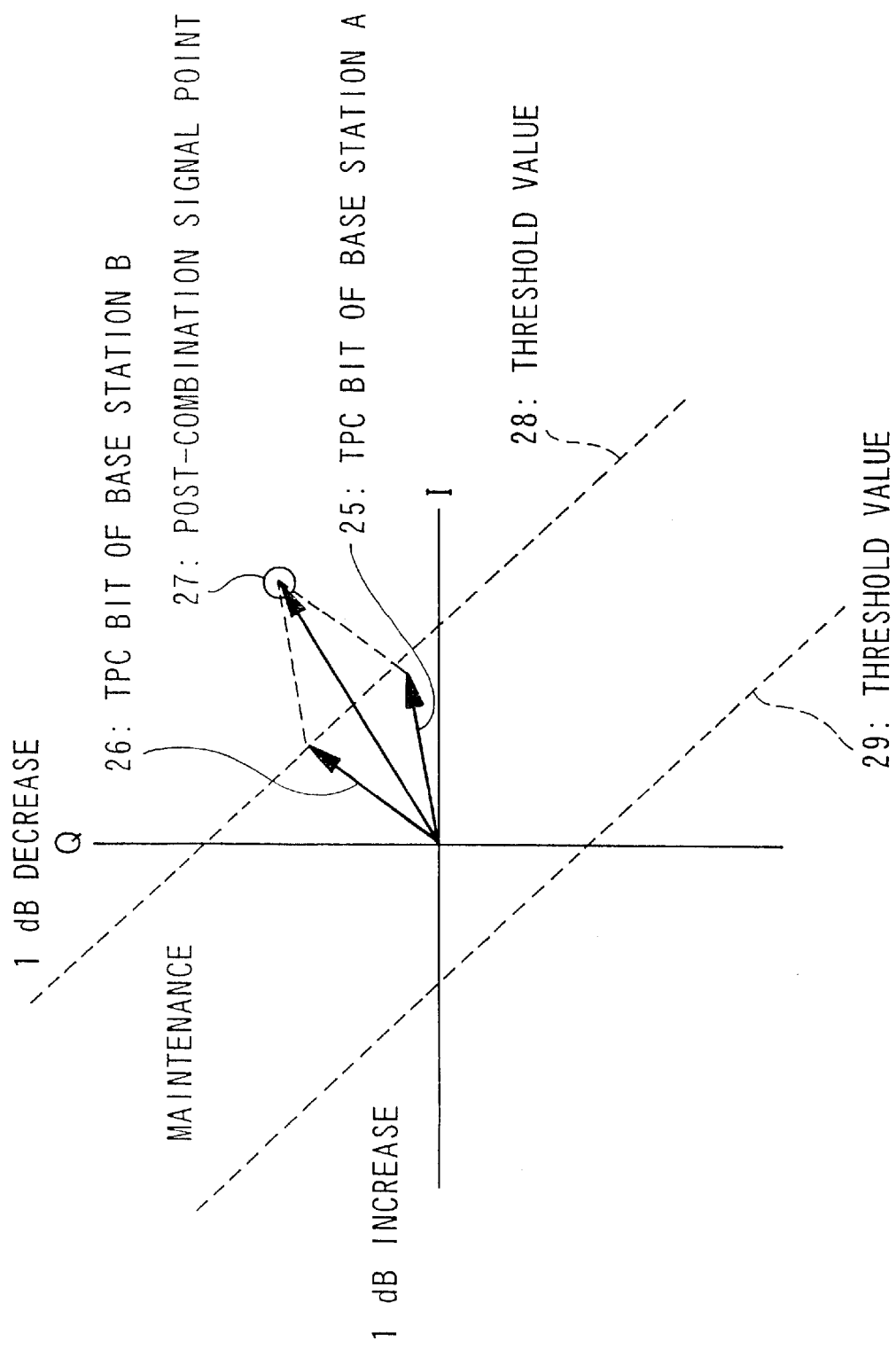
FIG. 5 is a diagram for explaining the combination process by the combining portion of a mobile station according to modification example 1 of a first embodiment during soft handover in a CDMA system.

FIG. 5 shows an example for a case where the transmission power is decreased by 1 dB. In this drawing, reference numbers 25, 26, and 27 respectively denote a TPC bit of the base station A, a TPC bit of the base station B, and a post-combination signal point, and reference numbers 28 and 29 denote different threshold values. However, threshold value 28 is more toward the first quadrant side than the threshold value 29. Since the post-combination signal point 27 is positioned to the first quadrant side (1 dB decrease region) with respect to the threshold value 28 in the example shown in this drawing, the content of the transmission power control decided by the transmission power control deciding portion 9 becomes a "1 dB decrease". Therefore, the transmission power of the transmission signal generated by the signal generating portion 10 is decreased by 1 dB. Similarly, if the post-combination signal point 27 is between the threshold value 28 and the threshold value 29, then "maintenance" control is performed, and if it is on the third quadrant side (1 dB increase region) with respect to the threshold value 29, then a "1 dB increase" control is performed.

A-5: Modification Example 2

Figure 6:
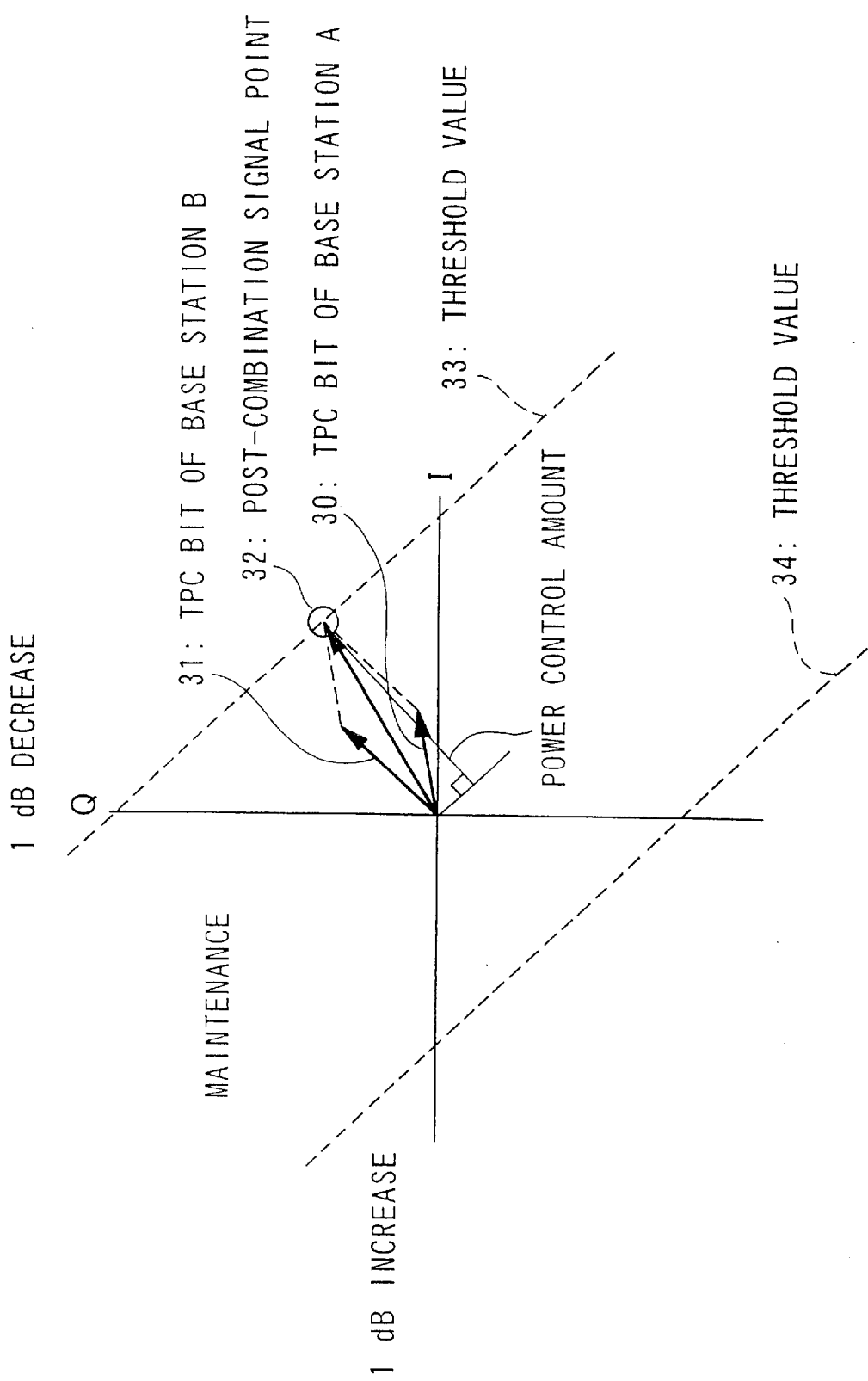
FIG. 6 is a diagram for explaining the combination process by the combining portion of a mobile station according to modification example 2 of a first embodiment during soft handover in a CDMA system.
Figure 7:
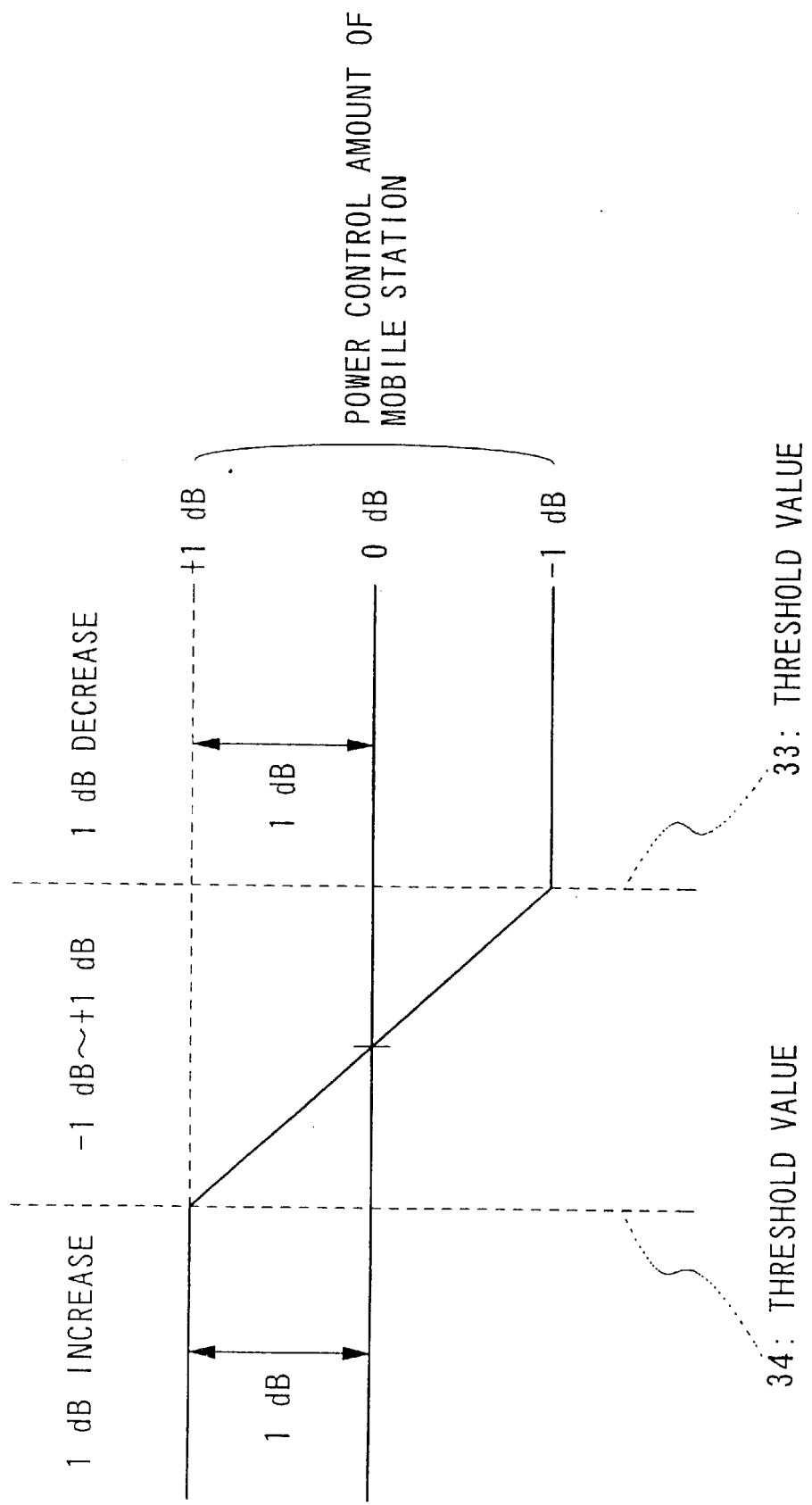
FIG. 7 is a diagram showing the transmission power control amount by the mobile station in modification example 2.

A modification example 2 which further modifies the above-described modification example 1 shall be explained. As with modification example 1, the structure of the mobile station according to the modification example 2 is the same as that of the mobile station 16 shown in FIG. 1. Additionally, the operations of the modification example 2 differ from the operations of the modification example 1 only with regard to the control content deciding process in the transmission power control deciding portion 9. As shown in FIGS. 6 and 7, the transmission power control deciding portion 9 according to the present modification example takes the area between the two threshold values as the control range between +1 dB and −1 dB. When the post-combination signal point is within the control range, the value indicated by the combination signal is placed in correspondence with the power control amount, and when it is not within the range, a 1 dB increase or a 1 dB decrease is performed as shown in FIG. 7. In FIGS. 6 and 7, reference numbers 30, 31, and 32 respectively denote a TPC bit of the base station A, a TPC bit of the base station B, and a post-combination signal point, and reference numbers 33 and 34 denote different threshold values. However, the threshold value 33 is on the first quadrant side with respect to the threshold value 34. Since the post-combination signal point 32 is positioned on the threshold value 33 in the example shown in FIG. 6, the content of the transmission power control decided by the transmission power control deciding portion 9 becomes a "1 dB decrease". Therefore, the transmission power of the transmission signal generated by the signal generating portion 10 is decreased by 1 dB. Of course, if the post-combination signal point 32 is between the threshold value 33 and the threshold value 34, control is performed in accordance with a power control amount (+1 dB to −1 dB) depending on the value indicated by the combination signal.

A-6: Supplement to the First Embodiment

With regard to the TPC bit combining method in the above-described first embodiment and modification examples, any publicly known method may be employed. For example, it is possible to employ a maximum ratio combining method, wherein the reception signal for each branch is weighted by a factor which is proportional to the amplitude level and inverse proportional to the noise power prior to adding; it is also possible to employ an equal-gain combining method, wherein the reception signals of all branches are weighted by the same factor prior to adding. (For details on these combining methods, see "Advanced Digital Communications", Kamilo Feher et al., Prentice-Hall Inc., 1986, and "Modern Communication Principles", Seymour Stein and J. Jay Jones, McGraw Hill Book Company). In essence, any combining method may be employed as long as it has sufficiently high precision in comparison to methods of combining after detection of the TPC bits.

B: Second Embodiment

B-1: Structure

Figure 8:
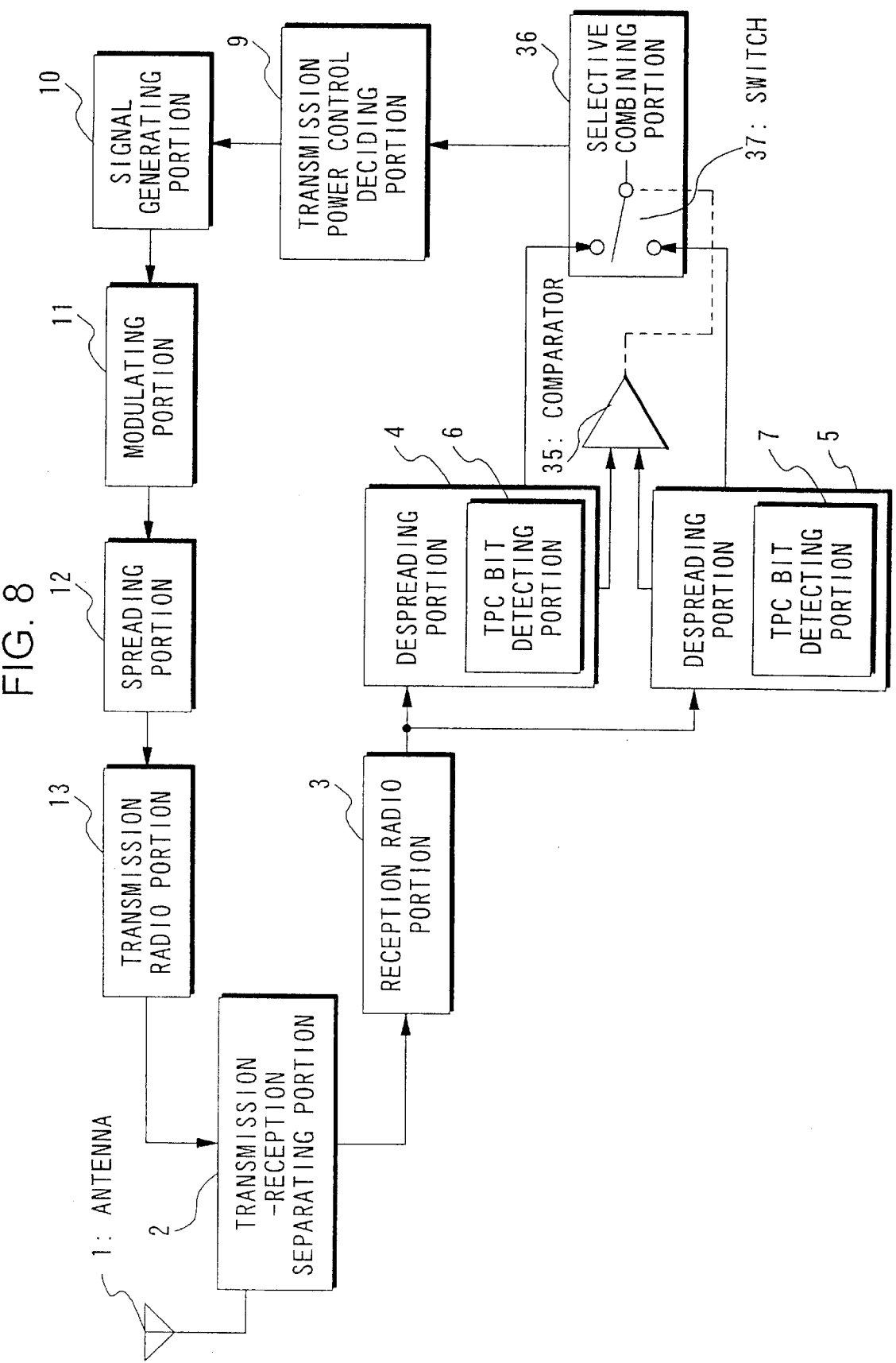
FIG. 8 is a block diagram showing the structure of the essential portions of a mobile station according to the second embodiment of the present invention.

FIG. 8 is a block diagram showing the structure of essential portions of a mobile station according to a second embodiment of the present invention. In the drawing, those parts which are the same as the parts in FIG. 1 are given the same reference numbers, and their explanation shall be omitted. The structure shown in FIG. 8 differs from the structure shown in FIG. 1 in that instead of a combining portion 8, a comparator 35 and a selective combining portion 36 are provided. The comparator 35 is for receiving as inputs reliability information outputted from the TPC bit detecting portions 6, 7 and comparing them. The selective combining portion 36 is for receiving as inputs the TPC bits outputted from the TPC bit detecting portions 6, 7 and selecting one for outputting to the transmission power control deciding portion 9.

The comparator 35 generates a selection signal indicating the TPC bit detecting portion 6 (i.e. the base station A14) if the value indicated by the reliability information outputted from the TPC bit detecting portion 6 is greater than or equal to the value indicated by the reliability information outputted from the TPC detecting portion 7, and generates a selection signal indicating the TPC bit detecting portion 7 (i.e. the base station B15) in the opposite case. The selective combining portion 36 has a switch 37 having two input ends for inputting the TPC bits outputted from the TPC bit detecting portion 6, 7, and an output end connected exclusively to one of the input ends. This switch 37 switches the input end connected to the output end in accordance with the selection signal generated by the comparator 35, and the selective combining portion 36 outputs the TPC bit (object signal) outputted from the output end of the switch 37 to the transmission power control deciding portion 9.

B-2: Operations

Next, the operations of the above-described mobile station shall be explained in detail. However, the explanations of the parts which are the same as those in the first embodiment shall be omitted.

During soft handover, the TPC bit from the base station A14 and reliability information thereof are determined in the TPC bit detecting portion 6, and the TPC bit from the base station B15 and reliability information thereof are determined in the TPC bit detecting portion 7. In the comparator 35, one of the above-mentioned reliability informations is compared with another one, and a selection signal indicating the output source (TPC bit detecting portion 6 or TPC bit detecting portion 7) of the one having the higher value is generated. In the selective combining portion 36, the input end of the switch 37 which corresponds to the output source indicated by the above-mentioned selection signal is connected with the output end, and the TPC bit outputted from this output end is outputted to the transmission power control deciding portion 9.

B-3: Summary

As described above, according to the present embodiment, the TPC bit having the highest reliability level is taken from among the TPC bits received from a plurality of connected base stations, so as to avoid the problem that the transmission power will always be decreased if an error occurs in the transfer of one of the TPC bits when all of the base stations are sending a TPC bit indicating an increase of the transmission power. Additionally, it is possible to reduce the influence that the TPC bits from base stations with high transfer error rate have on the transmission power control of the mobile station. As a result, a more accurate transmission power control can be achieved.

B-4: Supplement to the Second Embodiment

Modifications similar to those of modification examples 1 and 2 in the first embodiment can be made in the present embodiment as well. That is, as in modification example 1, it is possible to compare the output signal from the selective combining portion 36 with two preset threshold values; select the content of the transmission power control of the mobile station from among the three stages of increase, maintenance, and decrease based on this comparison result; and control the transmission power of the mobile station with the selected control content. And, as in modification example 2, it is possible to change the transmission power of the mobile station by a control amount depending on the output signal from the selective combining portion 36.

C: Overall Supplement

While the average SIR in the most recent predetermined period of time in the mobile station is used when determining the reliability information in the above-described embodiments, it is possible to use the instantaneous SIR in the mobile station, or to use other parameters such as described below.

Figure 9:
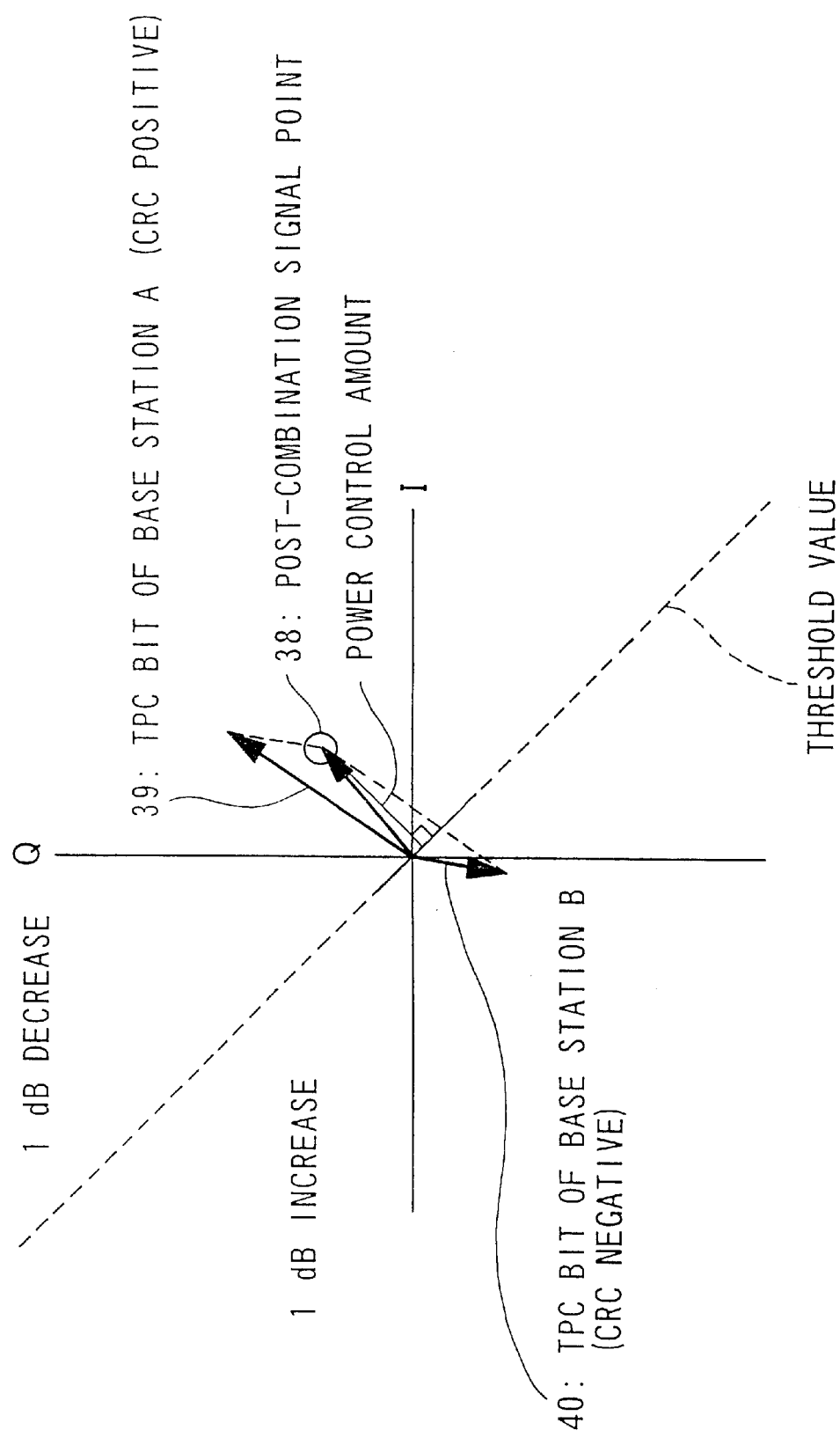
FIG. 9 is a diagram showing an example of a combining process based on a CRC verification result in a mobile station according to a modification example of an embodiment of the present invention.

For example, CRC's contained in the downward signals from the base station can be collated in the mobile station, and reliability information can be generated in accordance with the verification result (positive/negative). Here, an example of a combining process using reliability information based on the verification results of a CRC contained in the downward signal is shown in FIG. 9. In the example shown in this drawing, the verification result for the CRC contained in the downward signal from the base station A is "positive", while the verification result for the CRC contained in the downward signal from base station B is "negative". As is clear from the drawing, the influence on the post-combination signal point 38 is large for the TPC bits 39 from the base station A, and small for the TPC bits 40 from the base station B. That is, an effect similar to that of the first embodiment is obtained. Of course, the above-mentioned reliability information can be used in the case of selecting one of the TPC bits. Since the CRC's are appended in frame units, the mobile station must wait until the reception of the downward signal of one frame is completed before collating the CRC of the frame containing the TPC bit which is to be processed, thus causing a control delay; but, if the reliability information of the TPC bit in the current frame is generated based on the CRC verification result of the previous frame, then the above-mentioned control delay can be avoided.

Additionally, the reliability information can be generated based only on the reception level of the downward signal in the mobile station, or the reliability information can be generated based on only one parameter from among the above-mentioned average SIR, instantaneous SIR, and CRC verification result. Of course, the reliability information may also be generated by combining the various parameters as is appropriate.

Figure 10:
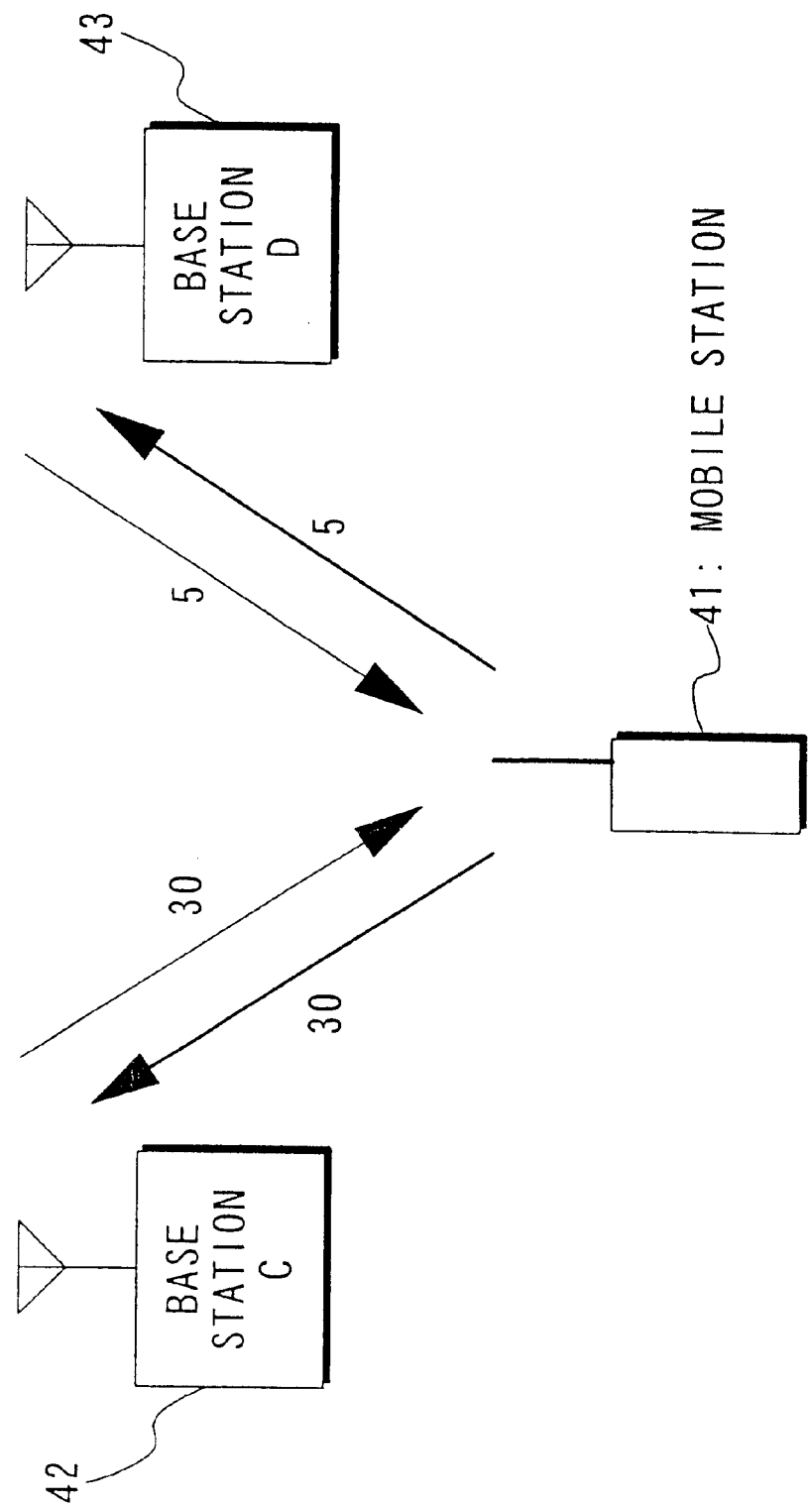
FIG. 10 is a diagram showing a summary of transmission power control of a mobile station based on the reception level of an up-going signal in a modification example of an embodiment of the present invention.

Additionally, in the above-described embodiments, the various parameters for determining the reliability information are determined from the downward signal, but they may also be determined from the upward signal. Here, an example wherein transmission power control of the mobile station is performed based on the reception level of the upward signal is shown in FIG. 10. In the example shown in this drawing, the upward signal from the mobile station 41 is received by the base station C42 and the base station D43, the reception levels of the upward signals received in the base stations are measured, and the measurement results (30 in the base station C42 and 5 in the base station D43) are inserted into the downward signals to the mobile station 41. The mobile station 41 receives the downward signals, and takes the reliability level of the base station C as being, for example, 30 based on the measurement result in the downward signal from the base station C42, and takes the reliability level of the base station D as being, for example, 5 based on the measurement result in the downward signal from the base station D43. The subsequent process is similar to the process used in the above-described embodiments, so the explanation shall be omitted.

Additionally, when the reliability information is generated by using a plurality of parameters, it is possible to determine all of the plurality of parameters from the downward signal, or to determine some of the parameters in the base station and other parameters in the mobile station. Additionally, when all of the plurality of parameters are determined from the downward signal, it is possible to generate the reliability information in the base station, and insert this into the downward signals to the mobile station. The downward channel into which the reliability information is inserted can be a channel for transmitting control information, or can be a channel for transmitting user information. Particularly in the former case, there is no need to make room for a new field inside the transfer frame, so that the reliability information can be transmitted while maintaining the transfer speed of the user information.

Furthermore, the units for increase and decrease of the transmission power are not restricted to 1 dB. For example, the transmission power control content can be made so as to be selected from among a 2 dB increase, a 1 dB increase, maintenance, a 1 dB decrease, and a 2 dB decrease. Additionally, the number of base stations to which the mobile station is simultaneously connected can be 3 or more, in which case it is possible to select a plurality of TPC bits and to combine the plurality of selected TPC bits, or to combine the TPC bits by separating them into a plurality of groups, and to select one TPC bit from among the plurality of post-combination TPC bits.

Additionally, the mobile station may comprise a CPU (central processing unit); a ROM (read-only memory) or the like, such that a program describing the processes to be performed by the mobile station is stored in the ROM; and the above-described transmission power control is performed when the CPU runs this program. Furthermore, this program can itself be made updateable, and such updates can be performed by reading the program from a recording medium via a dedicated interface or a telephone line (including radio channels with base stations).

As a practitioner of ordinary skill in the art will realize, the present invention is capable of many variations. All such variations to the invention come within the scope of the present invention.

We claim:

1. A transmission power control method for a mobile station simultaneously connected to a plurality of base stations, comprising:
    a receiving step for receiving a transmission power control signal from each of said plurality of base stations in said mobile station;
    a reliability level acquiring step for acquiring a reliability level for each of said plurality of base stations;
    an object signal acquiring step for determining an object signal from said reliability level acquired in said reliability level acquiring step and said plurality of transmission power control signals received in said receiving step;
    a control content deciding step for deciding a control content of the transmission power of said mobile station based on said object signal determined in said object signal acquiring step; and
    a control step for controlling the transmission power of said mobile station in accordance with the control content decided in said control content deciding step.

2. A transmission power control method according to claim 1, wherein said reliability level acquiring step includes, in said mobile station, acquiring a parameter based on a downward signal from each of said plurality of base stations, and generating a reliability level with respect to each of said plurality of base stations in accordance with said parameter.

3. A transmission power control method according to claim 1, wherein said reliability level acquiring step includes, in each of said plurality of base stations, acquiring a parameter based on an upward signal from said mobile station, and sending said parameter to said mobile station; and in said mobile station, generating a reliability level with respect to each of said plurality of base stations in accordance with the parameter sent from each of said plurality of base stations.

4. A transmission power control method according to claim 1, wherein said reliability level acquiring step includes, in each of said plurality of base stations, acquiring a parameter based on an upward signal from said mobile station, generating a reliability level for itself based on said parameter, and transmitting the generated reliability level to said mobile station; and in said mobile station, receiving the reliability level sent from each of said plurality of base stations.

5. A transmission power control method according to claim 1, comprising:
    a weighting step for weighting the transmission power control signals received in said receiving step according to said plurality of reliability levels acquired in said reliability level acquiring step;
    wherein said object signal acquiring step includes generating said object signal by combining the plurality of transmission power control signals weighted in said weighting step.

6. A transmission power control method according to claim 2, comprising:
    a weighting step for weighting the transmission power control signals received in said receiving step according to said plurality of reliability levels acquired in said reliability level acquiring step;
    wherein said object signal acquiring step includes generating said object signal by combining the plurality of transmission power control signals weighted in said weighting step.

7. A transmission power control method according to claim 3, comprising:
    a weighting step for weighting the transmission power control signals received in said receiving step according to said plurality of reliability levels acquired in said reliability level acquiring step;
    wherein said object signal acquiring step includes generating said object signal by combining the plurality of transmission power control signals weighted in said weighting step.

8. A transmission power control method according to claim 4, comprising:
    a weighting step for weighting the transmission power control signals received in said receiving step according to said plurality of reliability levels acquired in said reliability level acquiring step;
    wherein said object signal acquiring step includes generating said object signal by combining the plurality of transmission power control signals weighted in said weighting step.

9. A transmission power control method according to claim 1, wherein said object signal acquiring step includes selecting one signal from among the transmission power control signals received in said receiving step based on said plurality of reliability levels acquired in said reliability level acquiring step, and taking the selected signal as said object signal.

10. A transmission power control method according to claim 2, wherein said object signal acquiring step includes selecting one signal from among the transmission power control signals received in said receiving step based on said plurality of reliability levels acquired in said reliability level acquiring step, and taking the selected signal as said object signal.

11. A transmission power control method according to claim 3, wherein said object signal acquiring step includes selecting one signal from among the transmission power control signals received in said receiving step based on said plurality of reliability levels acquired in said reliability level acquiring step, and taking the selected signal as said object signal.

12. A transmission power control method according to claim 4, wherein said object signal acquiring step includes selecting one signal from among the transmission power control signals received in said receiving step based on said plurality of reliability levels acquired in said reliability level acquiring step, and taking the selected signal as said object signal.

13. A transmission power control method according to claim 1, wherein said control content deciding step includes comparing said object signal determined in said object signal acquiring step with two preset threshold values, and selecting and determining the control content of said mobile station from among the three stages of an increase, maintenance or decrease of the transmission power based on the results of the comparison.

14. A transmission power control method according to claim 2, wherein said control content deciding step includes comparing said object signal determined in said object signal acquiring step with two preset threshold values, and selecting and determining the control content of said mobile station from among the three stages of an increase, maintenance or decrease of the transmission power based on the results of the comparison.

15. A transmission power control method according to claim 3, wherein said control content deciding step includes comparing said object signal determined in said object signal acquiring step with two preset threshold values, and selecting and determining the control content of said mobile station from among the three stages of an increase, maintenance or decrease of the transmission power based on the results of the comparison.

16. A transmission power control method according to claim 4, wherein said control content deciding step includes comparing said object signal determined in said object signal acquiring step with two preset threshold values, and selecting and determining the control content of said mobile station from among the three stages of an increase, maintenance or decrease of the transmission power based on the results of the comparison.

17. A transmission power control method according to claim 1, wherein control is performed in said control content deciding step by changing the transmission power of said mobile station by a control amount in accordance with said object signal determined in said object signal acquiring step.

18. A transmission power control method according to claim 2, wherein control is performed in said control content deciding step by changing the transmission power of said mobile station by a control amount in accordance with said object signal determined in said object signal acquiring step.

19. A transmission power control method according to claim 3, wherein control is performed in said control content deciding step by changing the transmission power of said mobile station by a control amount in accordance with said object signal determined in said object signal acquiring step.

20. A transmission power control method according to claim 4, wherein control is performed in said control content deciding step by changing the transmission power of said mobile station by a control amount in accordance with said object signal determined in said object signal acquiring step.

21. A mobile station capable of simultaneously connecting with a plurality of base stations, comprising:
receiving means for receiving a transmission power control signal from each of said plurality of base stations;
reliability level acquiring means for acquiring a reliability level with respect to each of said plurality of base stations;
object signal acquiring means for determining an object signal based on said plurality of transmission power control signals received from said receiving means and said plurality of reliability levels acquired from said reliability level acquiring means;
control content deciding means for deciding a control content of the transmission power of said mobile station based on said object signal determined by said object signal acquiring means; and
control means for controlling the transmission power in accordance with said control content decided by said control content deciding means.

22. A mobile station according to claim 21, wherein said reliability level acquiring means acquires a parameter based on a signal from each of said plurality of base stations received by said receiving means, and generates a reliability level with respect to each of said plurality of base stations in accordance with said parameter.

23. A mobile station according to claim 21, wherein said reliability level acquiring means generates a reliability level with respect to each of said plurality of base stations in accordance with a parameter from each of said plurality of base stations received by said receiving means.

24. A mobile station according to claim 21, wherein said reliability level acquiring means takes the reliability level from each of said plurality of base stations received by said receiving means as the reliability level with respect to each of said plurality of base stations.

25. A mobile station according to claim 21, comprising:
weighting means for weighting each transmission power control signal received by said receiving means by the reliability level of a corresponding base station;
wherein said object signal acquiring means generates said object signal by combining the plurality of transmission control signals weighted by said weighting means.

26. A mobile station according to claim 22, comprising:
weighting means for weighting each transmission power control signal received by said receiving means by the reliability level of a corresponding base station;
wherein said object signal acquiring means generates said object signal by combining the plurality of transmission control signals weighted by said weighting means.

27. A mobile station according to claim 23, comprising:
weighting means for weighting each transmission power control signal received by said receiving means by the reliability level of a corresponding base station;
wherein said object signal acquiring means generates said object signal by combining the plurality of transmission control signals weighted by said weighting means.

28. A mobile station according to claim 24, comprising:
weighting means for weighting each transmission power control signal received by said receiving means by the reliability level of a corresponding base station;
wherein said object signal acquiring means generates said object signal by combining the plurality of transmission control signals weighted by said weighting means.

29. A mobile station according to claim 21, wherein said object signal acquiring means selects one from among said plurality of transmission power control signals to be said object signal.

30. A mobile station according to claim 22, wherein said object signal acquiring means selects one from among said plurality of transmission power control signals to be said object signal.

31. A mobile station according to claim 23, wherein said object signal acquiring means selects one from among said plurality of transmission power control signals to be said object signal.

32. A mobile station according to claim 24, wherein said object signal acquiring means selects one from among said plurality of transmission power control signals to be said object signal.

33. A mobile station according to claim 21, wherein said control content deciding means compares said object signal determined by said object signal acquiring means with two preset threshold values, and selects and decides from among the three stages of increase, maintenance or decrease of the transmission power as said control content based on the results of this comparison.

34. A mobile station according to claim 22, wherein said control content deciding means compares said object signal determined by said object signal acquiring means with two preset threshold values, and selects and decides from among the three stages of increase, maintenance or decrease of the transmission power as said control content based on the results of this comparison.

35. A mobile station according to claim 23, wherein said control content deciding means compares said object signal determined by said object signal acquiring means with two preset threshold values, and selects and decides from among the three stages of increase, maintenance or decrease of the transmission power as said control content based on the results of this comparison.

36. A mobile station according to claim 24, wherein said control content deciding means compares said object signal determined by said object signal acquiring means with two preset threshold values, and selects and decides from among the three stages of increase, maintenance or decrease of the transmission power as said control content based on the results of this comparison.

37. A mobile station according to claim 21, wherein said control content deciding means takes, as the control content, control performed by changing the transmission power by a control amount in accordance with said object signal determined by said object signal acquiring means.

38. A mobile station according to claim 22, wherein said control content deciding means takes, as the control content, control performed by changing the transmission power by a control amount in accordance with said object signal determined by said object signal acquiring means.

39. A mobile station according to claim 23, wherein said control content deciding means takes, as the control content, control performed by changing the transmission power by a control amount in accordance with said object signal determined by said object signal acquiring means.

40. A mobile station according to claim 24, wherein said control content deciding means takes, as the control content, control performed by changing the transmission power by a control amount in accordance with said object signal determined by said object signal acquiring means.

41. A base station for performing a transmission power control method according to claim 3, comprising:

parameter acquiring means for acquiring said parameter with respect to said mobile station based on an upward signal from said mobile station; and transmission means for transmitting said parameter acquired by said parameter acquiring means to said mobile station.

42. A recording medium containing a program to be run in a mobile station simultaneously connected to a plurality of base stations, the program comprising:

a receiving step for receiving a transmission power control signal form each of said plurality of base stations;

a reliability level acquiring step for acquiring a reliability level with respect to each of said plurality of base stations;

an object signal acquiring step for determining an object signal from said reliability levels acquired in said reliability level acquiring step and said plurality of transmission power control signals received in said receiving step;

a control content deciding step for deciding a control content of the transmission power of said mobile station based on said object signal determined in said object signal acquiring step; and a control step for controlling the transmission power of said mobile station in accordance with said control decided by said control content deciding step.

* * * * *

UNITED STATES PATENT AND TRADEMARK OFFICE
CERTIFICATE OF CORRECTION

PATENT NO. : 6,343,218 B1
DATED : January 29, 2002
INVENTOR(S) : Ryusuke Kaneda et al.

It is certified that error appears in the above-identified patent and that said Letters Patent is hereby corrected as shown below:

<u>Title page, Item [54] and Column 1, line 1,</u>
Delete "PHONE", and substitute -- STATION, -- in its place.

<u>Column 18,</u>
Line 16, delete "form" and substitute -- from -- in its place.

Signed and Sealed this

Twenty-first Day of January, 2003

JAMES E. ROGAN
*Director of the United States Patent and Trademark Office*